United States Patent

[11] 3,579,777

| [72] | Inventor | Victor Milewski |
| | | Troy, Mich. |
| [21] | Appl. No. | 805,442 |
| [22] | Filed | Mar. 10, 1969 |
| [45] | Patented | May 25, 1971 |
| [73] | Assignee | The Valeron Corporation |

[54] HELICAL END MILL
8 Claims, 5 Drawing Figs.

[52] U.S. Cl. ..................................................... 29/105
[51] Int. Cl. ........................................................ B26d 1/12
[50] Field of Search .......................................... 29/103, 103.1, 105, 105.1

[56] References Cited
UNITED STATES PATENTS
| 3,125,799 | 3/1964 | Bennett | 29/103 |
| 3,380,137 | 4/1968 | MacPetrie et al. | 29/103X |

FOREIGN PATENTS
| 393,391 | 6/1933 | Great Britain | 29/105 |
| 20,795 | 2/1961 | Germany | 29/105 |

OTHER REFERENCES
Article: Composite Helix Angles Reduce Milling Cutter Wear by K. Koenysbeyer and A. J. F. Sabberwal from Dec. 30, 1961 issue of Metalworking Production Magazine pages 65-—67.

*Primary Examiner*—Harrison L. Hinson
*Attorney*—Farley, Forster and Farley

ABSTRACT: A cutting tool with helical slots for replaceable helix blades that fit the slots, a common kerf or slit between the blade slots which follows their helix angle and provides a bifurcated shank with opposite sides of each slot wall on opposite shank parts, and a cross screw for drawing the shank parts together to close the blade slots and hold the helix blades in the slots for metal cutting use.

PATENTED MAY 25 1971    3,579,777

INVENTOR
VICTOR MILEWSKI
BY
ATTORNEYS

HELICAL END MILL

BACKGROUND OF THE INVENTION

Helical edged tools are commonly known as used for deep slotting, profiling, slab milling, etc. They are particularly useful with hard to machine metals where cutting in shear and the ability to curl and slide chips back out along the spiral flutes improves cutting proficiency and tool life. As a consequence, they are of growing importance to air frame and jet engine manufacturers and elsewhere as the use of harder to machine metals extends into other fields.

At present, most helical edged tools use brazed blades which are ground to size. Although efforts have been made to introduce throwaway tooling, which use helical blades that can be replaced, no one has been too successful because of serious shortcomings in these tools as currently known.

Most helical edged tools with replaceable blades, or inserts, use a wedge clamp in the insert slots. This requires a larger slot to accommodate the wedge and a consequent reduction in the material strength of the tool shank; which is particularly serious in small diameter tools. It also means a third member which must be made and handled and which must be qualified for solid support and adequate clamping pressure to meet all work material and cutting speed conditions.

There are other problems in providing good support for the wedge in the chip recess areas of the tool without interfering with chip flow or adversely affecting chip curl control. In many instances certain helix angles for the blades, and/or radial rake angles for the cutting edges, cannot be accommodated without introducing other problems and making it more practical to use brazed tooling.

What is needed is a simpler means of using replaceable helix inserts to provide helix edged tools, without a wedge clamp or like means that requires an enlarged blade slot, and which will assure blade-clamping pressure adequate to meet all work material and cutting conditions without interference with chip forming and flow control in the chip recess areas of the tool.

SUMMARY OF THE PRESENT INVENTION

The present invention relates to helical edged tools with replaceable insert blades that do not require a wedge clamp or like means in the blade slots.

The helix slots are formed to receive only the insert blades and their base or bottom wall is relieved by a saw kerf or slit, between relatively oppositely disposed slots, that extends clear through the tool shank and follows the helix angle of the slots. This provides a bifurcated or fluted shank with opposite sidewalls of each slot on opposite flutes of the tool shank. The only additional structure is a cross screw to draw the flutes of the shank together to close the insert slots and clamp the insert blades securely in place.

Although tools with slotted recesses for cutting inserts and a clamp screw to retain them, by closing the slot walls, are known, the use of a common relief between two insert slots and a common fastener to retain two separate inserts was first disclosed in U.S. Pat. 3,380,137 in the name of the present inventor.

This invention is a further advance in the art in teaching that insert blades with helix angles may also be accommodated by like means in having the common relief slot follow the helix angle of the slots or grooves for the inserts. In so doing, the chip recess or gash areas in helical edged tools will be unobstructed for free chip flow and forming control, solid wall support can be provided, and a much broader range of helix and radial rake angles can be accommodated than have heretofore been attainable.

DESCRIPTION OF THE DRAWING FIGURES

DETAILED DESCRIPTION OF ILLUSTRATED EMBODIMENT

Figure 1:
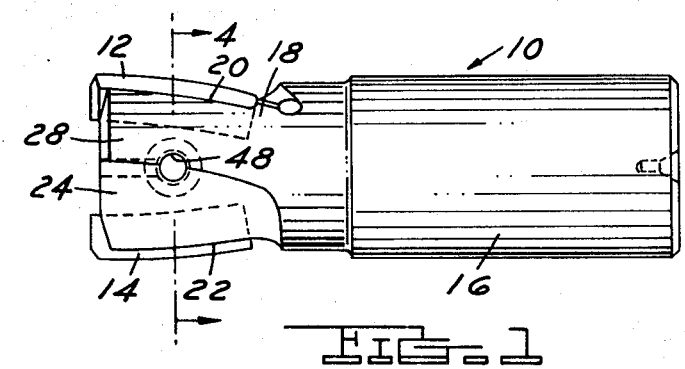
FIG. 1 is a side elevation of a two-fluted helical end mill made in accord with the teachings of the present invention.
Figure 2:
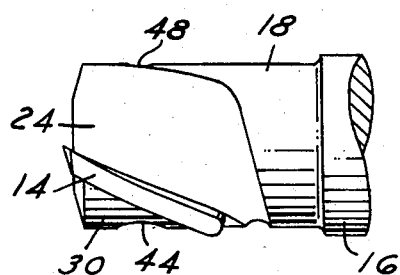
FIG. 2 is a fragmentary view of the end of the helical mill shown in the first drawing figure turned 90° on its axis to better show one of the insert blades.

The tool 10 shown in the drawings is a helical end mill of one piece construction, with two flutes and a center split for mechanically holding a pair of diametrically disposed helical-shaped insert blades 12 and 14.

The tool shank 16 has the tool head end 18 formed to include blade slots 20 and 22 which will accommodate the helix angle of the insert blades 12 and 14 and the desired radial rake angle for their cutting edge. Chip recesses or gashes 24 and 26 are provided on the cutting face sides of the blade slots, following the helix angles of the blades, and the heel or shank of each insert carrying flute 28 and 30 is formed for such clearance as is necessary behind the cutting land of the insert blades.

Figure 3:
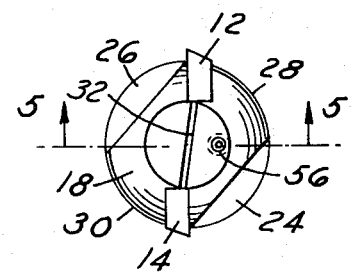
FIG. 3 is an end view of the tool shown in the first drawing figure.
Figure 4:
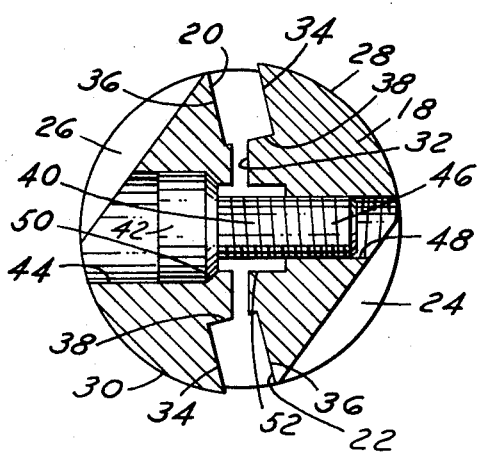
FIG. 4 is an enlarged cross-sectional view through the tool shank shown in the first drawing figure, with the cutting inserts removed, as seen in the plane of line 4—4 and looking in the direction of the arrows.

A saw cut or kerf 32 is shown in FIGS. 3 and 4 as extending radially across and through the axial centerline of the tool between the two blade slots 20 and 24. This is the condition that exists in all cross-sectional views but the saw kerf actually follows the helix angle of the two helix slots and in so doing forms a center split with a helix angle that forms the two flutes in the construction shown.

The helix split, or slit, may be formed by a saw blade oriented to miss the corners of the two blade slots 20 and 22 and with either the saw blade or the tool turned to provide the desired helix angle as the cut progresses. It may also be formed when the tool shank is made and other than on a straight radial line through the tool shank.

The kerf or slit 32 causes opposite sidewalls 34 and 36 of each blade slot to be on different flutes of the tool. It also provides a common relief in the base or bottom wall 38 of each slot which, when closed, will cause the slot walls to close and clamp an insert between them.

A screw fastener 40, between the two flutes of the tool and across the saw kerf slit 32, serves this purpose. The head end 42 of the fastener is received in a recess 44 in one chip gash and the threaded end 46 is engaged in a threaded hole 48 extending through the oppositely disposed chip gash. A seating shoulder 50 for the fastener head and a clearance space 52 across the slit 32 assures closing of the flute separation as the fastener is turned down.

The fastener 40 need not necessarily be through the chip gashes or recesses, as shown in the illustrated embodiment. In some instances the fastener 40 may be disposed at an angle across the kerf 32 such that the recess 44 and hole 48 are largely or wholly within the heel or shank of each flute 28 or 30.

A set screw 54 in the end of the tool, with a brass shoe 56 thereunder, is disposed for locking engagement with the screw fastener; the brass shoe being protection for the fastener threads.

Figure 5:
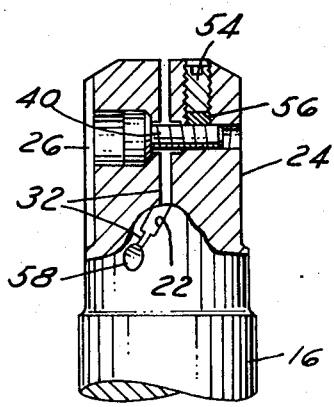
FIG. 5 is a partially cross-sectional view of the helical mill, as seen in the plane of line 5—5 in the third drawing figure and looking in the direction of the arrows.

FIG. 5 shows the saw kerf slit 32 as extending a little beyond the end of the helix slot and as having a bore hole 58 at its terminal end. This will be appreciated as reducing the amount of runby for the saw cut and to obtain sufficient surface area for the stresses in closing the split without fracture loading in this area.

Returning to considerations due in forming the blade slots 20 and 22, it will be appreciated that the saw cut or slit 32 will cause some relaxation and widening of the slots if formed after the slots for the blades are made. Although a reasonably loose fit is desired for the blades, when the fastener 40 is loosened, so that they are easy to remove and change, or shim, this should not be so much that they can fall out and be damaged.

Although not specifically shown, it will be appreciated that a differential screw fastener could be used to assure more positive separation of the shank parts, if one does not wish to rely on that obtained in their relaxed state.

It is also worth noting that the slot walls 34 and 36 should ideally be formed to grip the insert blades at their outer extremities first and to squeeze down on the inserts as the screw fastener 40 is applied. This provides the gripping force on the blades as near their cutting edge as is possible, eliminates any chip gap interference, and assures a seating pressure down on the blades. It also enables insert blades to be shimmed up and still gripped with the same precision despite the change in relative geometry between the blade and slot which results in its higher disposed shimmed position.

The screw fastener 40 is axially located on the tool shank as necessary to obtain the desired clamping pressures. In some instances this may be nearer the end of the tool; as for an end mill where the major work force is at the tool end. In most cases the cross section for back up support will be the most important consideration due.

Although only one clamp screw is shown and described, it is obvious that more than one could be used for longer blades or if other conditions so require.

As an example of the proficiency of the tool disclosed, an end mill with a 30° right-hand helix and a 2° positive radial rake, using a VC-2 carbide and running at 360 surface feet per minute was used on a 5HP horizontal mill to slot from solid 4,340 modified, aircraft steel, with a 259 BHN, and was capable of cuts in excess of 0.750 axial depths at 8 inch feed and 1.000 axial depths at 5.5 inch feed. Extremely good finishes were obtained despite less than test rigidity in the machine and spindle, because of its age and condition. Chip formation and ejection were excellent. And, no coolant was required.

The simple one piece construction proposed is stronger than wedge clamp and other two piece designs and assures greater safety for the operator when used on fast spindles. It can be build in much smaller sizes than heretofore possible, without a sacrifice in structural strength. Single and dummy blade uses are possible. Fewer blades enable use on both low and high horsepower machines and greater chip room for more proficient machining of the more ductile metals.

The tool is lower in initial cost than those presently known, requires less skill to change blades, enables different cutting materials to be used, as desired, and outperforms like tools in every essential aspect.

I claim:

1. A cutting tool, comprising;
a shank having a cutting blade receptive slot and next adjacent chip recess formed at a helix angle in the outer periphery thereof,
said shank being axially slit through the base of the slot on a like helix angle for disposing opposite sidewalls of the slot on opposite sides of the slit,
and means through the shank and intersecting the slit for closing the slit and drawing the slot sidewalls into clamping engagement with a cutting blade received in the blade receptive slot.

2. The cutting tool of claim 1 wherein,
said shank includes a pair of slots and ship recesses with said slit extending through the base of both slots,
and said slit closing means is disposed for drawing opposite sidewalls of both of the slots into clamping engagement with cutting blades received therein.

3. The cutting tool of claim 2 wherein,
said slots are oppositely disposed on said shank and said slit extends therebetween through the axial centerline of the shank.

4. The cutting tool of claim 3 wherein,
said shank is slit axially on a straight radial line and at a like helix angle through the base of said slots.

5. The cutting tool of claim 1, said slit closing means including a threaded fastener and locking means disposed for engagement with said threaded fastener.

6. A cutting tool comprising;
a shank having a pair of cutting blade receptive slots formed at helix angles in the periphery and on opposite sides thereof,
a common opening provided between said slots extending at a like helix angle through the base of each and throughout their full length for disposing opposite sidewalls of each slot on separated parts of the shank, and means for drawing the parts of the shank separated by said opening together for closing the slot sidewalls into clamping engagement with cutting blades received therein.

7. A helical end mill, comprising;
a shank rotatable about an axial centerline and having cutting blade receptive slots and next adjacent chip recesses formed in the outer periphery thereof on opposite sides and at like helix angles extending from the blade receptive end thereof,
said shank being slit at its blade receptive end to provide a separation through the base of each of said slots extending at like helix angles and for disposing opposite sidewalls of each slot on opposite parts of the shank,
and threaded fastener means extending between the parts of the shank for closing the base separation in said slots and drawing opposite sidewalls of said slots into clamping engagement with cutting blades disposed therein.

8. The helical end mill of claim 7 wherein,
said fastener means has shoulder stop engagement with one part of the shank and threaded engagement with the other part, and a setscrew through the terminal end of the shank for engaging and locking the threaded fastener means in its blade-clamping position.